J. ASTROM.
CHECK VALVE.
APPLICATION FILED NOV. 11, 1919.

1,366,151. Patented Jan. 18, 1921.

Inventor
J. Astrom

UNITED STATES PATENT OFFICE.

JOHN ASTROM, OF FORT WAYNE, INDIANA, ASSIGNOR TO FORT WAYNE ENGINEERING AND MANUFACTURING CO., OF FORT WAYNE, INDIANA.

CHECK-VALVE.

1,366,151.

Specification of Letters Patent.

Patented Jan. 18, 1921.

Application filed November 11, 1919. Serial No. 337,275.

*To all whom it may concern:*

Be it known that I, JOHN ASTROM, a citizen of the United States, and resident of Fort Wayne, in the county of Allen and State of Indiana, have invented certain new and useful Improvements in Check-Valves; and I do hereby declare that the following is a full, clear, and exact description thereof.

My invention relates to new and useful improvements in check valves, more particularly of that type adapted for disposition in a pipe line.

It is in general the object of my invention to simplify and otherwise improve the structure and to increase the efficiency of valves of this character, particularly with respect to the provision of a valve which affords a positive and complete seal in its checking action, and having an exceedingly quick closing action to prevent retrograde flow of liquid therethrough.

It is further my object to provide a valve of this character having minimum external measurements, permitting use of the valve under restricted conditions, without detracting from the provision of a desired full area of the discharge port.

A further object resides in the provision of a valve comprising a minimum number of readily assembled parts, and wherein the valve member may be most readily removed and replaced.

A still further object resides in the provision of a check valve which is operable with full efficiency in its checking action in whatever position the valve may be placed with respect to the vertical plane.

A still further object resides in the provision of an improved method of forming the valve seats and discharge port of the valve.

With the above and other objects and advantages in view, which will be apparent as the description proceeds, my invention resides in the novel features of construction, combination and arrangement of parts, which will be hereinafter more particularly described and defined by the appended claims.

Figure 1:
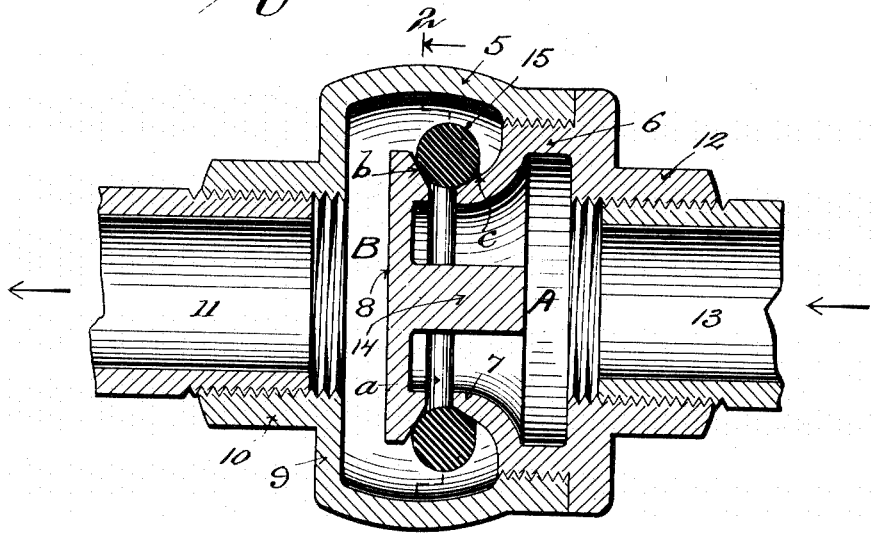
Figure 1 is a longitudinal sectional view through a valve constructed in accordance with my invention, on a plane indicated by the line 1—1 of Fig. 2.
Figure 2:
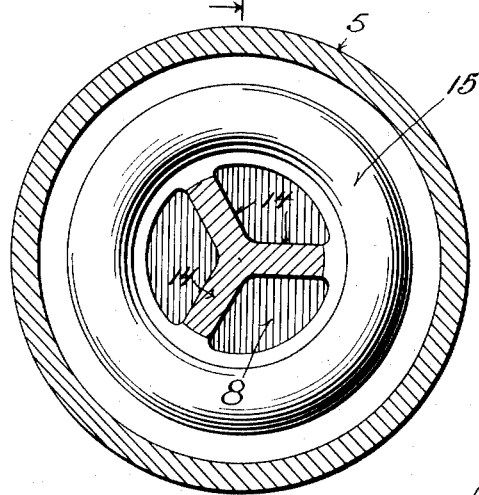
Fig. 2 is a transverse sectional view through the valve on a plane indicated by the line 2—2 of Fig. 1.
Figure 3:
Fig. 3 is a detail sectional view showing the opening movement of the valve member.

Referring now more particularly to the drawings, the present embodiment of my improved check valve comprises a casing member having an annular wall portion 5 which is open at one end and internally threaded for the reception of a correspondingly threaded cylindrical portion 6 of a valve seating member which includes a substantially frusto-conical portion 7 extending into the casing member and terminating in a circular wall 8 which is extended past the periphery of the frusto-conical section to afford a shoulder outstanding from the inner end of said section. The casing member 7 is provided with an end wall 9 spaced from the partition wall 8 and carrying a sleeve portion 10 threaded for the reception of a pipe section 11 or other connecting member. The outer portion of the valve seating member is reduced to form a similar sleeve portion 12 for the reception of a second pipe 13 or other coupling member.

I thus provide an intake chamber A within the valve seating member, and a discharge chamber B within the main casing member, and communication with these chambers is afforded by an annular discharge port $a$ cut in the frusto-conical section 7 immediately adjacent the partition wall 8, said wall being connected with the partition by a series of webs 14 arranged radially in the section 7 and integrally connected therewith and with the wall 8. The valve proper comprises a resilient ring 15 disposed about the discharge port $a$ and contracted against a pair of valve seating faces at the sides of the port. One of these faces, $b$, is formed by the peripheral portion of the adjacent side of the partition wall 8 and is inclined at an angle of preferably sixty degrees to the plane of the axis of the valve ring 15. The other face, $c$, is formed by the outer periphery of the frusto-conical section 7, and is preferably disposed at an angle of thirty degrees with respect to the plane of the axis of the valve ring, the essential feature of the angularity of these faces with respect to the ring, being that one of the faces is inclined at a greater angle than the other face whereby expansive action of fluid on the ring 15 will tend to roll the ring backwardly upon the face having the lesser angularity, which is the face $c$ in the present instance, thus procuring an easy-opening action without detracting from the quick closing movement of the ring, and also avoiding tendency of the ring to vibrate or flutter upon the occurrence of expansive pressure such as might occur were both of the seating faces to be disposed at the same angularity.

My entire valve structure is thus formed of three parts, the ring 15 and the two casting members and it will be noted that a minimum number of machining operations are necessary in the formation of the valve structure, the only machining operations apart from the thread connections of the casting members being the formation of the valve faces $b$ and $c$, and of the discharge port $a$ which is formed by cutting into and through the frustoconical section 7 at its juncture with the partition wall 8. The method of forming the discharge port by this circumferential cutting action is important inasmuch as it permits a more uniform and perfect casting of the valve seating member by providing for a more free flow of metal to the partition wall 8, as will be apparent to those skilled in the art of casting.

I have thus provided an exceedingly simple and efficient valve which possesses a maximum compactness of structure in proportion to the area of its discharge port, and it is further noted that an even flow of liquid to the valve is permitted by reason of the annular shape of the discharge port, together with the tapering reduction of the conical section 7, leading thereto, and it is noted that the wall portion 5 of the outer casing member is bulged outwardly adjacent the valve ring whereby to present a transversely concave interior surface. Inasmuch as the valve ring 15 is formed to engage against its seats with slight contractile tension, the valve will instantly close upon the cessation of flow therethrough in the normal direction, whereby any retrograde flow is positively prevented, and retrograde pressure will serve to wedge the valve ring against its seats.

While I have shown and described a preferred embodiment of my invention, it will be appreciated that various changes and modifications of structure may be employed to meet differing conditions of use, without departing in any manner from the spirit of my invention.

What is claimed is:

1. A valve of the class described comprising an inlet chamber, an outlet chamber surrounding a portion of the inlet chamber, said inlet chamber being provided with an annular discharge port opening into the outer chamber, valve seating faces at the sides of said port disposed at different angles with respect to the plane of the port, and a contractile valve ring disposed about said port and engaged against said seats whereby the pressure of fluid exerted on said ring from the inlet chamber will cause said ring to move rearwardly on the valve seat having lesser angularity.

2. A valve of the class described comprising a casing member, a hollow valve seating member having a frusto-conical portion projecting into the casing member, a partition wall member disposed in spaced relation to the inner end of the frustoconical member to define a discharge port therebetween, integral web portions connecting said frustoconical portion and wall member, and a contractile valve ring surrounding said discharge port.

3. A valve of the class described comprising an outer casing member having an annular wall portion and an end wall provided with an outlet port, a valve seating member having a hollow portion provided with an inlet port and threaded in said annular wall portion and a frustoconical portion extending inwardly from said threaded portion, a partition wall spaced between the said end wall and the frustoconical portion and providing a valve seat at its peripheral portion coöperating with a similar seat provided by the frustoconical portion, and a contractile valve ring engaged against said seats.

4. That method of forming a valve seating unit of the class described which consists in casting a partition wall portion and a hollow frusto-conical portion in one piece with connecting webs disposed in said frusto-conical portion and with the wall of the frusto-conical portion integral throughout its circumference with the partition wall portion, and in then cutting into and through the frusto-conical portion adjacent its juncture with the partition wall portion to provide an annular discharge port.

In testimony that I claim the foregoing I have hereunto set my hand at Fort Wayne, in the county of Allen and State of Indiana.

JOHN ASTROM.